United States Patent
Rhie et al.

(10) Patent No.: US 11,095,432 B2
(45) Date of Patent: Aug. 17, 2021

(54) SYSTEM FOR PROCESSING DATA BASED ON BLOCKCHAIN AND OPERATING METHOD THEREOF

(71) Applicant: SAMSUNG SDS CO., LTD., Seoul (KR)

(72) Inventors: Ji Hwan Rhie, Seoul (KR); Nyun Soo Hyun, Seoul (KR); Jeong Ho Kim, Seoul (KR); Doo Yeol Kim, Seoul (KR); Jeong Hee Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 481 days.

(21) Appl. No.: 15/933,680

(22) Filed: Mar. 23, 2018

(65) Prior Publication Data

US 2018/0294955 A1    Oct. 11, 2018

(30) Foreign Application Priority Data

Apr. 5, 2017   (KR) .................. 10-2017-0044318
Aug. 29, 2017   (KR) .................. 10-2017-0109266

(51) Int. Cl.
| | |
|---|---|
| *H04L 29/00* | (2006.01) |
| *H04L 9/06* | (2006.01) |
| *H04L 9/32* | (2006.01) |
| *G06F 16/27* | (2019.01) |
| *G06F 16/22* | (2019.01) |

(52) U.S. Cl.
CPC ........ *H04L 9/0637* (2013.01); *G06F 16/2272* (2019.01); *G06F 16/27* (2019.01); *H04L 9/32* (2013.01); *H04L 9/3236* (2013.01); *H04L 9/3297* (2013.01); *H04L 2209/38* (2013.01)

(58) Field of Classification Search
CPC .............. H04L 2209/38; H04L 9/0637; H04L 2209/56; H04L 9/32; H04L 9/3236; H04L 9/3297; G06F 16/27; G06F 16/2272
See application file for complete search history.

(56) References Cited

U.S. PATENT DOCUMENTS

| | | | | |
|---|---|---|---|---|
| 9,992,022 | B1 * | 6/2018 | Chapman | G06F 21/604 |
| 2018/0189732 | A1 * | 7/2018 | Kozloski | G06F 8/71 |
| 2018/0343305 | A1 * | 11/2018 | Lotter | H04L 9/3236 |

FOREIGN PATENT DOCUMENTS

| | | |
|---|---|---|
| KR | 10-1628009 B1 | 6/2016 |
| KR | 10-1784219 B1 | 10/2017 |

\* cited by examiner

*Primary Examiner* — Ghazal B Shehni
(74) *Attorney, Agent, or Firm* — Sughrue Mion, PLLC (57) ABSTRACT

Provided is a blockchain management apparatus comprising at least one hardware processor configured to implement a block generation order control unit which prevents a block generation node of a plurality of blockchain nodes from generating a new block of a blockchain in response to a determining, by the blockchain management apparatus, that the new block is a block generated by the block generation node within a unit section, wherein the unit section corresponds to a preset number of blocks measured from a current block corresponding to a current block height of the blockchain, and the blockchain management apparatus manages a permission-based blockchain network including the plurality of blockchain nodes.

12 Claims, 10 Drawing Sheets

SYSTEM FOR PROCESSING DATA BASED ON BLOCKCHAIN AND OPERATING METHOD THEREOF

This application claims priority from Korean Patent Application No. 10-2017-0044318 filed on Apr. 5, 2017 and No. 10-2017-0109266 filed on Aug. 29, 2017 in the Korean Intellectual Property Office, the disclosure of both of which are hereby incorporated by reference in their entirety.

BACKGROUND

1. Field of the Disclosure

The present disclosure relates to a system for processing data based on blockchain. More specifically, the present disclosure relates to a system capable of improving the performance of an application based on blockchain through high-speed data processing and a method for operating the system.

2. Description of the Related Art

A blockchain refers to a data management technique in which persistently increasing data are recorded in blocks of a specific unit, and each node constituting a peer-to-peer P2P network connects and manages the blocks like a chain or data itself in which the blocks are connected like a chain. The data connected like a chain is operated in the form of a distributed ledger at each node without a central system.

Figure 1:
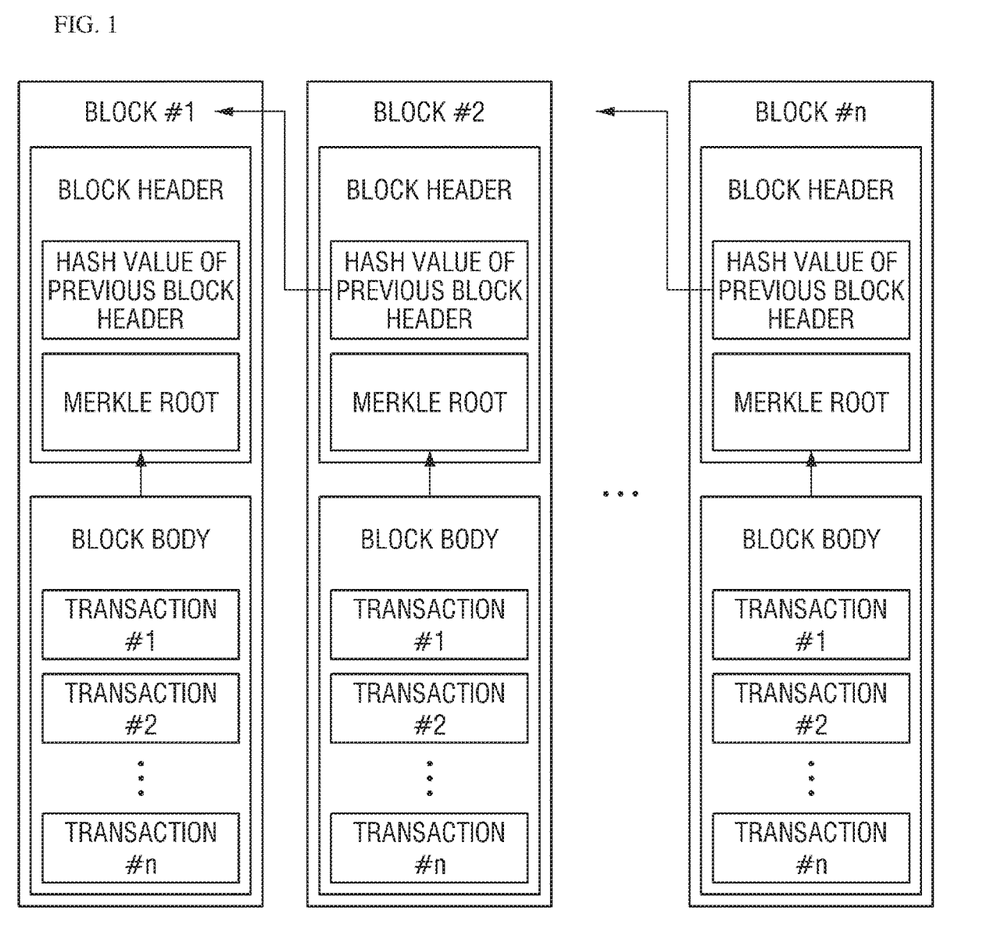
FIG. 1 is a diagram for explaining a structure of blockchain data maintained by each node constituting a blockchain network.

Each node constituting the blockchain network manages the block with the data structure illustrated in FIG. 1. A hash value of the preceding block is recorded on each block, and the preceding block can be referred to, using the hash value. Therefore, as the blocks are accumulated, it is difficult to make an attempt at the forgery of the transaction data recorded in the block, and the reliability of data recorded in each block can be improved.

Each node constituting the blockchain network maintains the consistency and integrity of the transaction data by maintaining the distributed ledger of the same content. If the contents of the distributed ledger retained between each node are different, the contents of the longest connected chain is trusted. For this reason, if a particular node continuously generates a new block earlier than other nodes and maintains the longest chain, since it is possible to arbitrarily falsity the transaction data, a consensus algorithm is applied to prevent this.

The blockchain of the bit coin series adopts a proof of work (PoW) type, and this is a method for preventing block generation monopolization of the particular node by forcing the operation of obtaining a nonce in which the target hash value is satisfied.

However, when a consensus algorithm such as work proof is used, even if the blocks are generated simultaneously in the plurality of nodes, since only one block is finally included in the distributed ledger on the blockchain, there is a problem in which an overall throughput of the system based on blockchain is limited to an amount of transaction which is put in a single block.

For example, in the case of bit coins, since one block is generated every ten minutes on average, and the size of one block is limited to 1 MB, the throughput level is restricted to about seven pieces per second.

SUMMARY

An aspect of the present disclosure provides a system for processing data based on blockchain that provides high-speed data processing performance.

Another aspect of the present disclosure provides a method for processing an instant transaction, using the system for processing data based on blockchain.

According to an embodiment of the present disclosure, there is provided a blockchain management apparatus comprising at least one hardware processor configured to implement a block generation order control unit which prevents a block generation node of a plurality of blockchain nodes from generating a new block of a blockchain in response to a determining, by the blockchain management apparatus, that the new block is a block generated by the block generation node within a unit section, wherein the unit section corresponds to a preset number of blocks measured from a current block corresponding to a current block height of the blockchain, and the blockchain management apparatus manages a permission-based blockchain network including the plurality of blockchain nodes.

According to another embodiment of the present disclosure, there is provided a system for processing data comprising a first blockchain network including a first plurality of blockchain nodes, wherein a first blockchain is associated with the first blockchain network and a second blockchain network including a second plurality of blockchain nodes, wherein a second blockchain is associated with the second blockchain network, and the first blockchain network is configured to process a first transaction for a first electronic wallet of a user, and the second blockchain network is configured to process a second transaction for a second electronic wallet of the user, and a total balance of electronic currency associated with the user is a sum of a first balance of the first electronic wallet and a second balance of the second electronic wallet.

According to still another embodiment of the present disclosure, there is provided a method comprising receiving, by a first blockchain node among a plurality of blockchain nodes, a transaction request, wherein the transaction request is associated with a target transaction, a first user as a sender and a second user as a receiver, verifying, by the first blockchain node, a validity of the target transaction, providing a notice, by the first blockchain node to a terminal of the second user, of a completion of the verifying of the target transaction; and transferring, by the first blockchain node, transaction data associated with the transaction request to a block generation node, wherein the transaction data is recorded, by the block generation node, in a new block, and wherein the transaction request is processed in response to the completion of the verifying before being recorded in the new.

The aspects of the present disclosure are not limited to those mentioned above but another aspect which is not mentioned will be clearly understood from the description below to ordinary technicians in the technical field of the present disclosure.

According to the present disclosure described above, it is possible to variably control the size and/or block generation cycle, using a permission-based blockchain network. As a result, the response speed and throughput of the system for processing data based on blockchain or the blockchain application based on the data processing system can be greatly improved.

Further, it is possible to execute parallel block generation, using a plurality of blockchain networks corresponding to each of the hierarchically configured electronic wallets. As a result, since the transaction processing can also be executed in parallel, it is possible to further improve the response speed and the throughput of the system for processing data based on blockchain.

It is also possible to provide an instant transaction service between trading parties of electronic currency on the basis of a permission-based blockchain network. As a result, the satisfaction level of the user who uses the blockchain application service can be improved.

The effects of the present disclosure are not limited to the effects mentioned above, and another effect which has not been mentioned can be clearly understood by ordinary technicians from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Before describing the present specification, some terms used in this specification will be clarified.

In the present specification, blockchain data or blockchain itself is a data which is held by the respective nodes constituting the blockchain network, and means data in which at least one block is connected in the form of a chain. When the data recorded in each block is transaction data, the blockchain data may mean a distributed ledger. However, the data recorded in each block may be of any type. The structure of the above blockchain data will be described referring to FIG. 1.

In this specification, a blockchain network means a network of P2P structure constituted by plurality of blockchain nodes operated in accordance with a blockchain algorithm.

In this specification, the blockchain node means a subject which constitutes the blockchain network, and holds and manages blockchain data in accordance with the blockchain algorithm. The blockchain node may be provided as a single computing apparatus. However, when provided as a virtual machine or the like, a plurality of nodes may exist in a single computing apparatus.

In this specification, the block generation node means a node which generates the block via mining among the blockchain nodes constituting the blockchain network.

In the present specification, permission may be understood with a comprehensive concept including authentication and authorization.

Prior to describing some embodiments of the present disclosure, in order to provide convenience of understanding, with reference to FIG. 2, a brief explanation will be given of the consensus algorithm of the work proof type and the problem of performance degradation accordingly. Hereinafter, the type of data recorded in the blockchain data is assumed to be transaction data unless otherwise stated. However, the scope of the present disclosure is not limited to the type of data.

Figure 2:
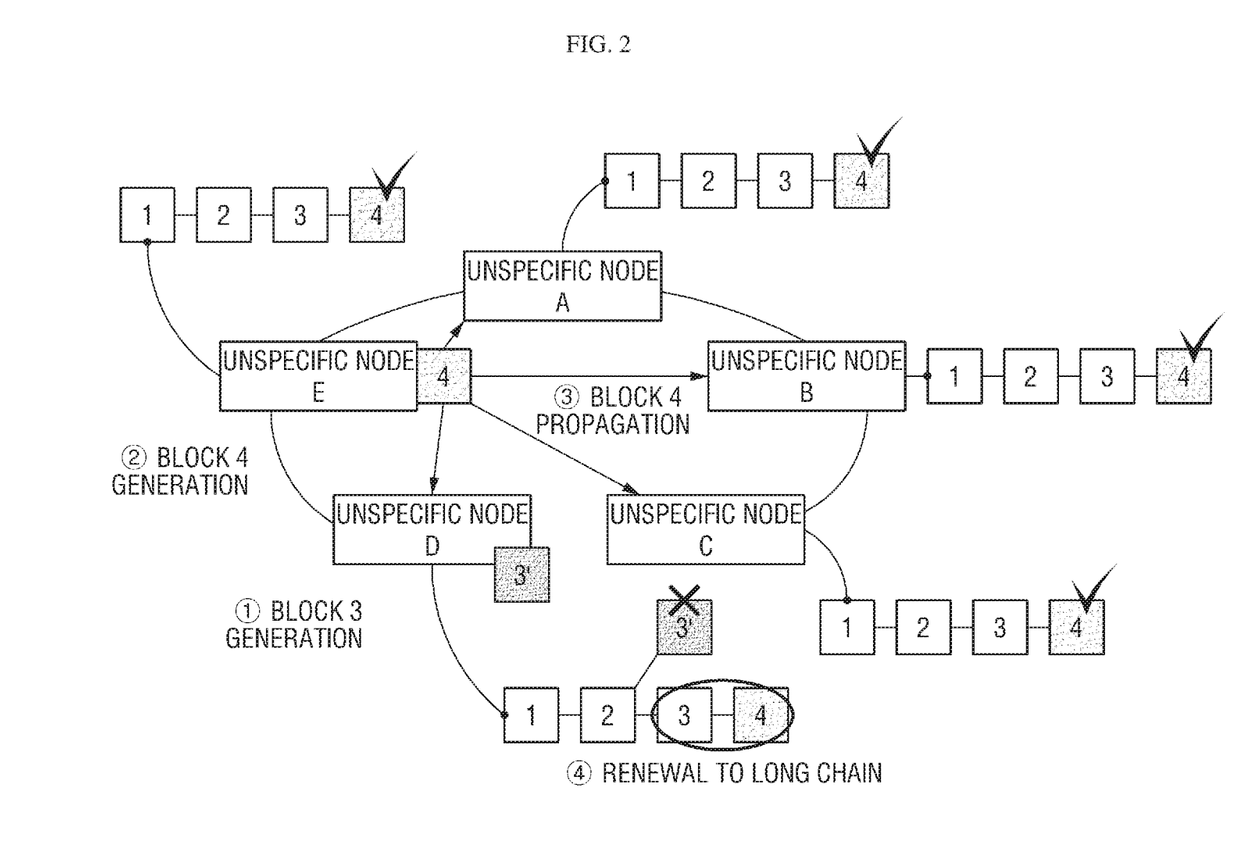
FIG. 2 is a diagram for explaining a consensus algorithm of the work proof type and a problem of performance degradation due to the consensus algorithm.

Referring to FIG. 2, since each blockchain node participating in the blockchain network is a non-authenticated unspecific node, it is required to verify validity of the block generation. The work proof algorithm is one of the consensus algorithms for proving the validity, and the specific operation thereof is as follows. Each blockchain node randomly substitutes a hash value, provides the cost of the corresponding computing in the process of finding the nonce that satisfies the given target hash value, and validity of the blockchain node is verified on the basis of the computing cost.

When the nonce satisfying the target hash value is found, generation of a block is performed. For example, when the blockchain node D finds the nonce value, a block 3' is generated (1), and the transaction data may be recorded as long as the size of the block 3 permits.

In the blockchain network, generation of new blocks can occur simultaneously. For example, a block 3' occurs at the same time as the block 3, and as illustrated in FIG. 2, a branch may be formed in the blockchain data managed by the blockchain node D.

Problems associated with branch formed on blockchain data can be solved in accordance with the addition of new blocks in the future. For example, if the blockchain node E generates block 4 and the block 4 is propagated to another blockchain node on the network ((2), (3)), the blockchain node D updates the blockchain data on the basis of the longer chain, and thus, the formed branch may disappear ((4)).

However, since the block 3' is discarded in the above procedure, the computing power of the blockchain node D is meaninglessly consumed, and confirmation of the transaction data recorded in the block 3' is also delayed. That is, in the case of using the work proof type, even if a plurality of blocks is simultaneously generated, since only one block is finally recognized as a significant block, the throughput of the system is greatly reduced. Also, since the confirmation of the transaction recorded in the discarded block is delayed, there is a problem that the transaction processing time increases and the computing resources of the blockchain node are meaninglessly wasted.

Hereinafter, some embodiments of the present disclosure will be described in detail with reference to the accompanying drawings.

FIGS. 3 through 6 are diagrams for explaining a system for processing data based on blockchain according to some embodiments of the present disclosure.

The system for processing data based on blockchain is a system that processes data generated by a blockchain application (e.g., electronic wallet) at high speed. For example, the data processing system described above may be, but is not limited to, a system that processes transaction data generated between user terminals equipped with electronic wallets at high speed. For convenience of explanation, however, the system for processing data based on blockchain according to some embodiments of the present disclosure will be described on the premise that the system is the above transaction data processing system.

Figure 3:
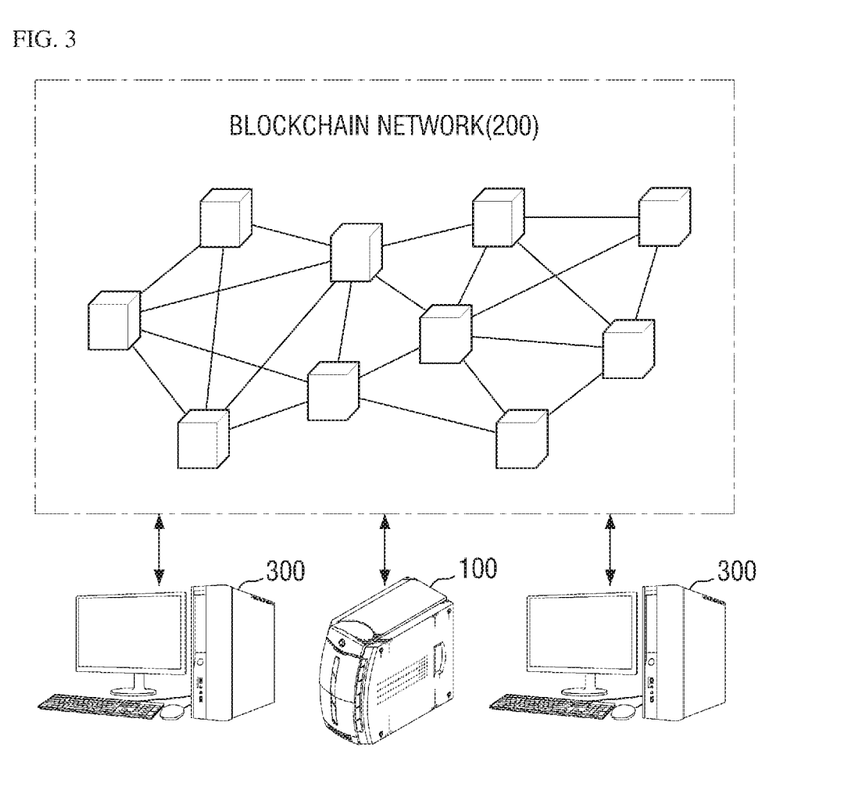
FIG. 3 is a configuration diagram of a system for processing data based on blockchain according to a first embodiment of the present disclosure.

First, FIG. 3 is a block diagram of the system for processing data based on blockchain according to the first embodiment of the present disclosure.

The system for processing data based on blockchain according to the first embodiment may be configured to include a blockchain network 200 including a plurality of blockchain nodes, a blockchain management apparatus 100, and a user terminal 300. However, this is only the preferred embodiment for achieving the object of the present disclosure, and some constituent elements may, of course, be added or deleted as necessary. In addition, each of the constituent elements of the system for processing data based on blockchain illustrated in FIG. 3 illustrates functionally distinguished functional elements, and it is noted that at least one constituent element may be provided in a form of being integrated with each other in an actual physical environment. For example, the blockchain management apparatus 100 and/or the user terminal 300 may also be provided as one of the blockchain nodes constituting the blockchain network 200. The constituent elements of the system will be described below.

In the first embodiment, the blockchain network 200 is a network of a P2P structure including a plurality of blockchain nodes. The blockchain nodes constituting the blockchain network 200 executes the operations such as generation of blocks, propagation, verification, recording, etc., on the basis of the blockchain algorithm. In addition, each blockchain node holds the same blockchain data.

According to an embodiment of the present disclosure, the blockchain network 200 may be a permission-based blockchain network. That is, the blockchain network 200 may be a network in which only the permitted blockchain nodes participate. Here, the permission-based blockchain network may be used to be mixed with terms such as a private blockchain network in the technical field, but the permission-based blockchain network may refer to the same meaning. According to this embodiment, since participation of nonspecific node is eliminated, it is not necessary to require excessive work proofs required for block generation. Therefore, unnecessary computing resources and waste of time can be minimized, and the performance of the entire system utilizing the blockchain network can be improved accordingly.

According to the embodiment of the present disclosure, in order to construct a permission-based blockchain network, the permission verification may be executed for each of the user region of the blockchain application service, the block of the blockchain node region and the generation node region. Hereinafter, a method for verifying the permission being executed in each region will be briefly described.

In the case of the user region of the blockchain application service, the authentication and/or the management of the authority of the service user can be executed. For example, an access control is executed via an ACL (access control list) at the API level, or a permission verification of the user can be executed, using the user's electronic signature used for the transaction request.

In the case of the blockchain node region, at the time when the each blockchain node starts to participate in the blockchain network, the verification can be performed, using the permission information (e.g., the permission information recorded in the environment setting file) stored on each node in advance. Here, the permission information may be information which is controlled by the blockchain management apparatus 100 or periodically updated in accordance with the embodiment. Or, in a step in which each blockchain node and other blockchain nodes perform the setup of the P2P communication, mutual permission verification between the nodes may be executed. At this time, the mutual permission verification may be executed, for example, using permission information (e.g., a whitelist including information on permitted blockchain nodes) stored on the blockchain data. When permission information is stored on the blockchain data, there may be an effect of preventing forgery of permission information. The permission information may be, for example, information which is set by the blockchain management apparatus 100.

In the case of the block generation node region, the permission verification of the new block can be executed. For example, each blockchain node can add only the new block, which is generated by the block generation node in which the permission is verified, to the blockchain data. At this time, the verification of the permission can be executed in the same way as explained in the blockchain node region. Alternatively, the block generation node forces the electronic signature to be recorded on the new block at the time of generating the new block, and other blockchain node verifies the electronic signature. Thus, the permission verification may be executed.

According to the embodiment of the present disclosure, since presence or absence of the line of the block generation node greatly affects the reliability of the blockchain network, second permission which is the permission verification standard of the blockchain node may be set to a higher permission than the first permission which is the permission verification standard of the blockchain node.

In the first embodiment, the blockchain management apparatus 100 is a computing apparatus that controls or manages the operation of each blockchain node constituting the blockchain network. Here, the computing apparatus may be, but is not limited to, a notebook, a desktop, a laptop, or the like, and may include all type of apparatuses equipped with computing means and communication means.

According to the embodiment of the present disclosure, the blockchain management apparatus 100 can variably control the block size, the block generation cycle, etc. in order to improve the throughput of the system for processing data based on blockchain. For example, the blockchain management apparatus 100 can set the size of the block to a larger value in order to increase the number of transactions recorded in each block. In another example, in order to increase the block generation speed, the blockchain management apparatus 100 can control the block generation cycle to be a smaller value. This will be described later with reference to FIG. 7.

In addition, the blockchain management apparatus 100 can control the generation order of the blocks so that each block generation node can fairly generate the blocks. This will be described later with reference to FIGS. 7 and 8.

Also, the blockchain management apparatus 100 may collect various kinds of information used in the blockchain network management, such as presence or absence of occurrence of branch on the blockchain data, the state of each blockchain node, and the new block propagated onto the blockchain network. For example, the blockchain management apparatus 100 may collect various kinds of information from the monitoring node which is one of the blockchain nodes constituting the blockchain network. The monitoring node can be understood as a special type of node that monitors the operation of each blockchain node on the blockchain network. For example, the monitoring node can intercept various kinds of information transmitted and received on the blockchain network, and may transfer various kinds of information to the blockchain management apparatus 100, but the operating mode of the monitoring node may be any mode.

In the first embodiment, the user terminal 300 is a terminal used by a user who is provided with the blockchain application service, and is a computing apparatus mounted with a blockchain application such as an electronic wallet. Here, the computing apparatus may be, but is not limited to, a laptop computer, a desktop, a laptop, a smartphone, etc., and may include all kinds of apparatuses equipped with the computing means and the communication means.

The user can trade the electronic currency with other users using the electronic wallet installed on the user terminal 300, and the user terminal 300 can process the transaction data generated by the user's electronic currency transaction request through the blockchain network 200.

According to the embodiment of the present disclosure, an instant transaction can be executed between the user terminals 300 by ensuring the reliability of the blockchain network 200 on the basis of permission. For example, when transaction data for remitting a electronic currency from the electronic wallet of the first user terminal to the electronic wallet of the second user terminal, before the transaction data is recorded in the new block and propagated, the transaction processing is completed, and the electronic currency remittance processing can be completed. According to the present embodiment, the response speed of the transaction process is improved, and the satisfactory of the user who uses the blockchain application service can be improved. A detailed description of this embodiment will be given later with reference to FIG. 11.

In a system for processing data based on blockchain according to some embodiments of the present disclosure, each constituent element can communicate with each other via a network. Here, the network may be provided as any type of wired/wireless network such as a local region network (LAN), a wide area network (WAN), a mobile radio communication network, and a wireless broadband Internet (Wibro).

The system for processing data based on blockchain according to the first embodiment of the present disclosure has been described above with reference to FIG. 3. Next, a system for processing data based on blockchain according to a second embodiment of the present disclosure will be described with reference to FIG. 4.

Figure 4:
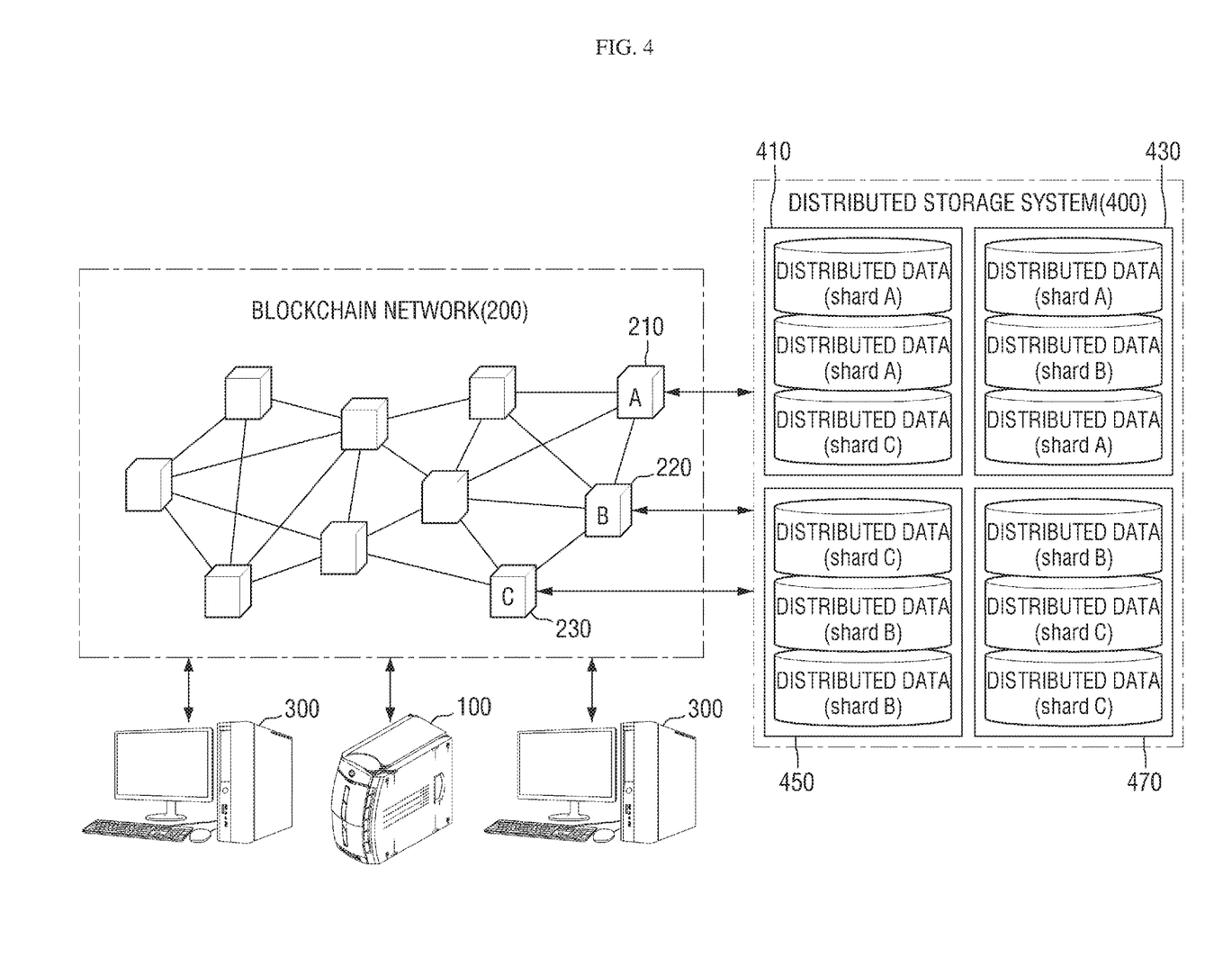
FIG. 4 is a configuration diagram of a system for processing data based on blockchain according to a second embodiment of the present disclosure.

FIG. 4 is a configuration diagram of the system for processing data based on blockchain according to the second embodiment of the present disclosure.

Referring to FIG. 4, the system for processing data based on blockchain according to the second embodiment may be configured to further include an external distributed storage system 400. Although FIG. 4 illustrates an example in which the distributed storage system 400 includes a plurality of storage nodes 410, 430, etc. and is provided as a distributed database using a shading technique, the distributed storage system 400 may be provided in any type.

In the second embodiment, at least one blockchain node constituting the blockchain network can keep blockchain data in the distributed storage system 400. FIG. 4 illustrates an example in which the blockchain data of the blockchain node A to node C (210 to 230) are kept in the distributed storage system 400. According to the present embodiment, it is possible to solve the problem of the restriction of the physical space in which the each blockchain node may be experienced.

According to the second embodiment, the blockchain data is not stored in each blockchain node on the basis of the file system, but is distributed and stored in a database built on the distributed storage system 400. Thus, the overall data processing performance of the system can be improved. For example, by utilizing the powerful indexing function provided by the database, the data input/output speed can be improved, thereby improving the system performance. The index of database can be constructed, for example, to have direct access to balance (e.g., UTXO) for each electronic wallet. In addition, indexes can be built in various ways, depending on the data access pattern of the system.

The system for processing data based on blockchain according to the second embodiment of the present disclosure has been described above referring to FIG. 4. Next, a system for processing data based on blockchain according to a third embodiment of the present disclosure will be described with reference to FIGS. 5 and 6.

Figure 5:
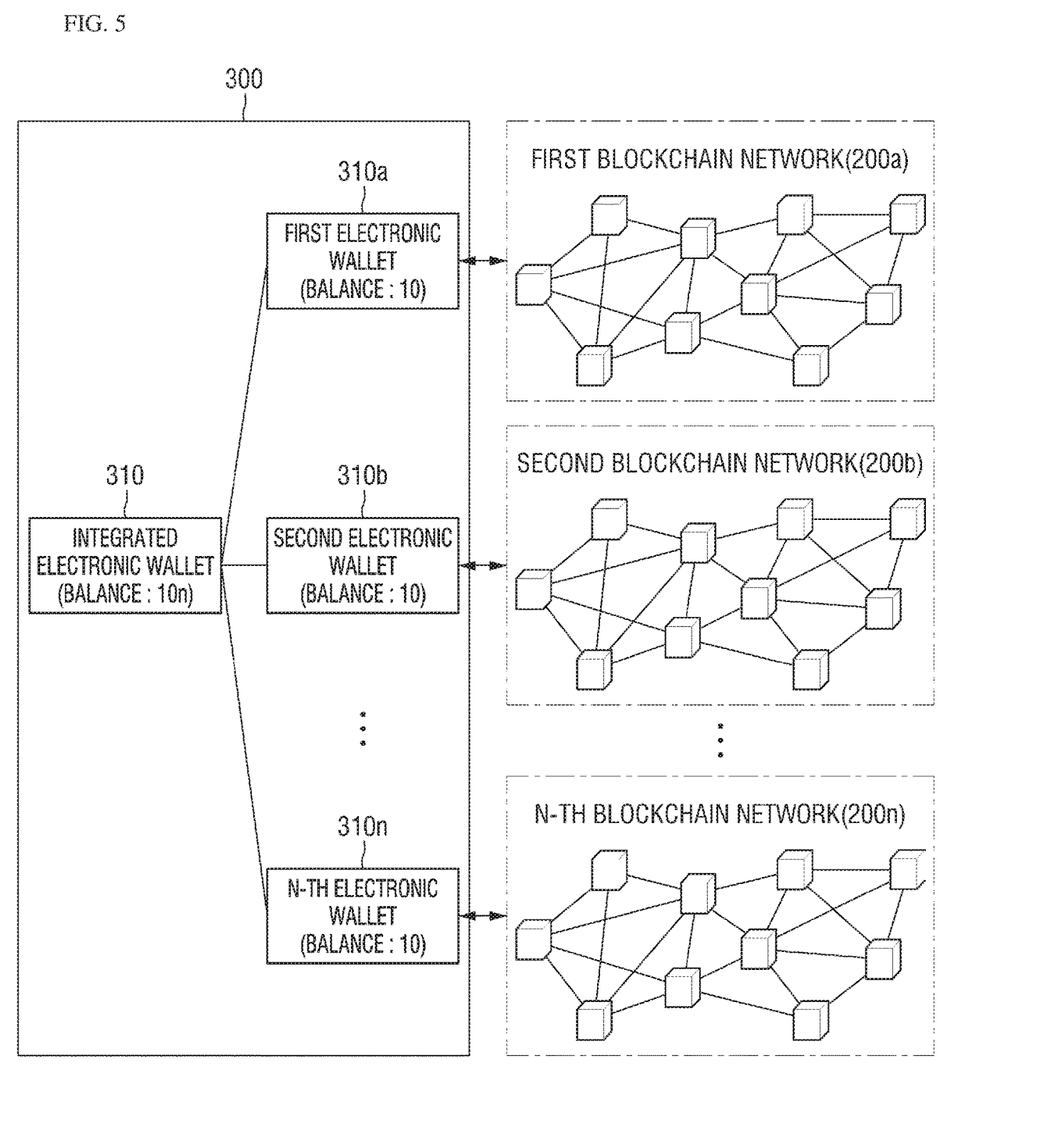
FIGS. 5 and 6 are diagrams for explaining a system for processing data based on blockchain according to a third embodiment of the present disclosure.

FIG. 5 is a configuration diagram of the system for processing data based on blockchain according to the third embodiment of the present disclosure. For convenience of explanation, the blockchain management apparatus 100 is not illustrated.

Referring to FIG. 5, in the system for processing data based on blockchain according to the third embodiment, a blockchain network 200 can be divided into first to nth blockchain networks 200a to 200n. By utilizing a plurality of divided blockchain networks 200a to 200n, the block generation can be processed in parallel, thereby greatly increasing the throughput of the whole system.

Specifically, the electronic wallet 310 installed in the user terminal 300 may include an internally integrated electronic wallet 310 and the first to n-th electronic wallets 310a to 310n. Accordingly, the total balance of the electronic currency held by the user can be determined by the sum of the electronic currencies kept in the first to n-th electronic wallets. In addition, the first to n-th electronic wallets 310a to 310n are interlocked with the first to nth blockchain networks 200a to 200n, respectively, and the transaction processing can be executed in parallel. Therefore, the transaction data throughput can be greatly improved.

Figure 6:
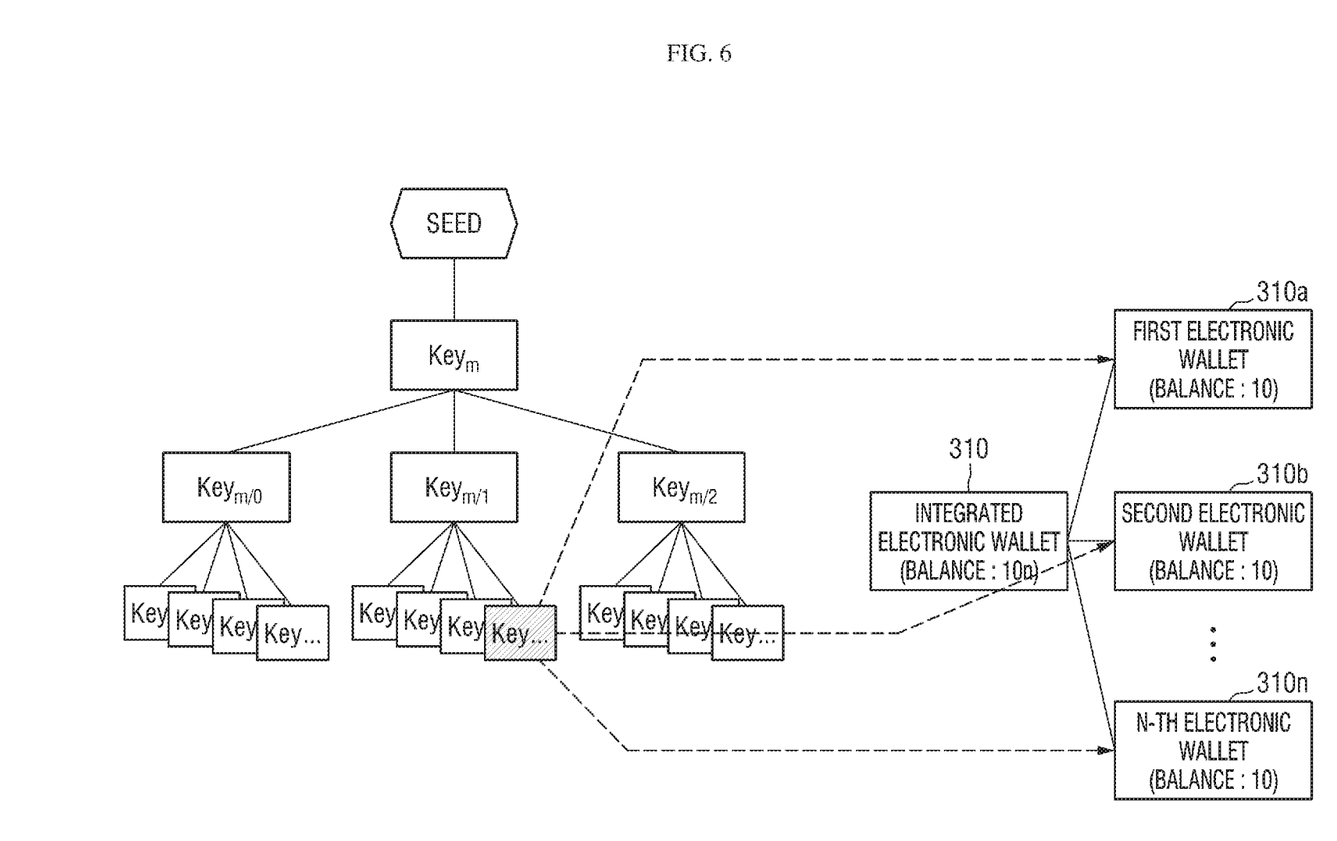

According to the embodiment of the present disclosure, as illustrated in FIG. 6, the first to n-th electronic wallets 310a to 310n can be based on the same public key 311. According to the present embodiment, there is an advantage that transaction data recorded in each blockchain network 200a to 200n can be inquired by utilizing one public key 311, and easiness of the transaction data management can be enhanced.

Further, according to an embodiment of the present disclosure, the transaction requested by the user may be processed with at least one electronic wallet among the first to n-th electronic wallets 310a to 310n in accordance with a predetermined criterion. The predetermined criterion can be set in various ways in order to solve the problem that the parallelism of the transaction processing deteriorates. That is, when the electronic currency balance of a specific electronic wallet is first exhausted, the transaction processing may not be executed in the blockchain network linked with the specific electronic wallet, and the parallelism of the transaction processing deteriorates. Accordingly, in order to solve this problem, the predetermined criterion can be set in various ways.

As an example, the above transactions can be processed with the electronic wallet with the largest electronic currency balance. As another example, the above transaction may be divided into a plurality of transactions and executed such that the electronic currency kept in each of the electronic wallets 310a to 310n is equally deducted. According to the embodiment, when the difference between the balances of the electronic currency kept in each of the electronic wallets 310a to 310n becomes equal to or larger than a threshold value, the balance can be adjusted to be even.

According to the embodiment of the present disclosure, if specific blockchain networks 200a to 200n satisfies the preset conditions (e.g., reaching the limit of storage capacity), the blockchain data is transferred to the external storage, and the new blockchain data can be generated. For example, if the first blockchain network 200a satisfies the preset condition, a genesis block is generated on the basis of the electronic currency balance data held by each user, among the plurality of transaction data recorded in the first blockchain data, and the first blockchain data can be transferred to an external storage. Thereafter, as a new transaction is generated in accordance with the genesis block, new second blockchain data is generated, and the existing transaction inquiry may be executed through the first blockchain data kept in the external storage. According to the present embodiment, it is possible to effectively manage the continuously increasing blockchain data.

The system for processing data based on blockchain according to the third embodiment of the present disclosure has been described above with reference to FIGS. 5 and 6. Hereinafter, the blockchain management apparatus 100 and the user terminal 300 which are constituent elements of the system for processing data based on blockchain according to some embodiments of the present disclosure will be described in detail with reference to FIGS. 7 to 10.

First, the configuration and operation of the blockchain management apparatus 100 according to the embodiment of the present disclosure will be described with reference to FIGS. 7 to 9.

Figure 7:
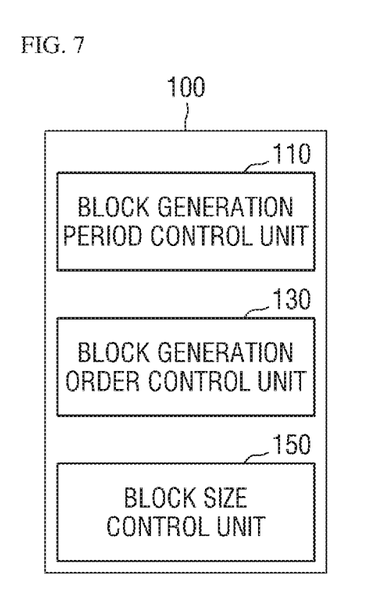
FIG. 7 is a block diagram illustrating a blockchain management apparatus which is a constituent element of the system for processing data based on blockchain.

FIG. 7 is a block diagram illustrating the blockchain management apparatus 100.

Referring to FIG. 7, the blockchain management apparatus 100 may include a block generation cycle control unit 110, a block generation order control unit 130, and a block size control unit 150. However, only the constituent elements associated with the embodiment of the present disclosure are illustrated in FIG. 7. Therefore, one of ordinary skill in the art to which the present disclosure belongs can understand that other general-purpose constituent elements may be included in addition to the constituent elements illustrated in FIG. 7. In addition, each constituent element of the blockchain management apparatus 100 illustrated in FIG. 7 illustrates functionally distinguished functional elements, and it is noted that at least one constituent element may be provided in the manner of being integrated with each other in an actual physical environment.

Each constituent element will be described. The block generation cycle control unit 110 variably controls the block generation cycle of the blockchain node constituting the blockchain network. When using a work proof algorithm for the block generation, an average time required to generate a block can be calculated as in the following formula 1. A difficulty refers to the difficulty for finding a nonce value that meets the target value, and a hash rate is the number of hash operations executed per second, and may be understood to indicate the power.

$$\text{Average Time} = \frac{\text{difficulty} \times 2^{32} \times \text{hour}}{3600 \times \text{hashrate}} \quad \text{[Formula 1]}$$

Referring to the above formula 1, the block generation cycle control unit 110 can control the block generation cycle by raising or lowering the difficulty of block generation.

According to the embodiment of the present disclosure, the block generation cycle control unit 110 can variably control the block generation cycle on the basis of the branch occurrence frequency on the blockchain data during a predetermined period. For example, when the branch occurrence frequency during a predetermined period exceeds a preset threshold value, the block generation cycle control unit 110 may perform the control such that the block generation cycle increases by raising the block generation difficulty. Here, the branch occurrence frequency can be calculated on the basis of information on presence or absence of occurrence of branch received from a monitoring node which is a special node constituting the blockchain network. Although not illustrated in FIG. 7, the blockchain management apparatus 100 may further include a monitoring unit (not illustrated) that receives information on whether the branch occurs from the monitoring node.

Next, the block generation order control unit 130 performs the control so that a block can be generated fairly between the block generation nodes. Specifically, the block generation order control unit 130 performs the control such that a new block cannot be generated when the block generated by the block generation node exists on the unit section including a preset number of block, on the basis of the block corresponding to the current block height. In order to provide convenience of understanding, a more detailed description will be given to the block generation order control unit 130 with reference to FIG. 8.

Figure 8:
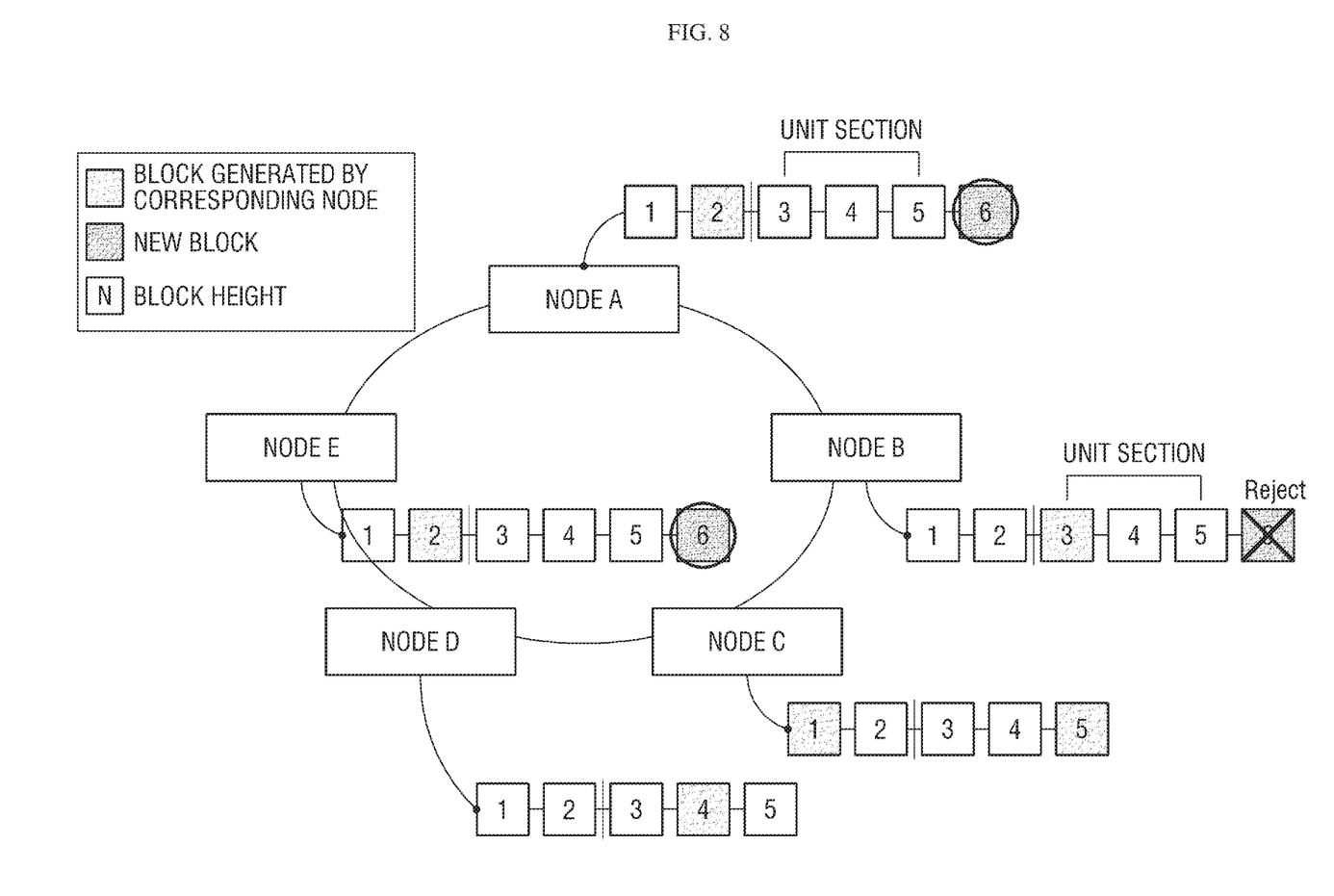
FIG. 8 is a diagram for explaining a block generation order control unit which is a constituent element of the blockchain management apparatus.
Figure 9:
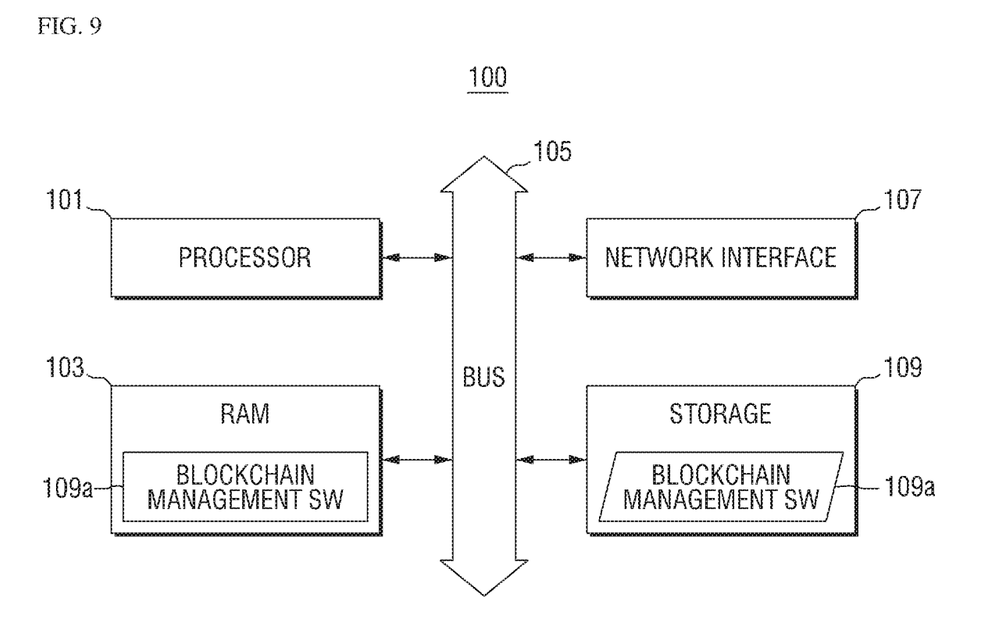
FIG. 9 is a hardware configuration diagram of the blockchain management apparatus which is a constituent element of the system for processing data based on blockchain.

FIG. 8 illustrates an example in which block generation is controlled when the predetermined number is "3".

Referring to FIG. 8, it is possible to understand that, in the blockchain data of block generation node A (201), the block corresponding to the current block height is block 5, and the blocks included on the unit section on the basis of the block 5 are the block 3 to block 5. Then, since there is no block generated by the block generation node A (201) on the unit section including three blocks, the new block 6 generated by the block generation node A (201) can be added on the blockchain data.

In contrast, the case of the block generation node B (203) will be described. Since the block 3 generated by the block generation node B (203) exists on the unit section, the new block 6 generated by the block generation node B (203) cannot be added on the blockchain data and is rejected.

According to the embodiment of the present disclosure, the number of blocks included in the unit section can be updated to a larger value as the number of block generation nodes increases. According to an embodiment of the present disclosure, this embodiment can be provided, using predetermined control parameters having values in the range of 0 to 1. Specifically, if the block generation order control unit 130 sets the control parameter, the number of blocks included in the unit section can be determined as a descending value or an ascending value of the product of a value obtained by subtracting 1 from the number of block generation nodes, and the control parameter. According to the present embodiment, when the value of the control parameter is set to 1, all the block generation nodes can be controlled to sequentially generate one block, and if the value of the control parameter is set to 0, the control of the block generation order is not performed. Thus, each block generation node can continuously generate the blocks. For reference, when the value of the control parameter is set to 1 and a failure occurs in the specific block generation node, the block generation may falls into the infinite standby state. Therefore, the value of the control parameter may be preferably set, in consideration of all of the scale of the system, the resource situation, the number of block generation nodes, and the like.

Further, according to the embodiment of the present disclosure, the control parameter can be a value that fluctuates depending on the number of block generation nodes. For example, as the number of block generation nodes increases, the value of the control parameter can be updated to a smaller value.

Also, according to the embodiment of the present disclosure, the block generation order control unit 130 may control the block generation order only when the number of block generation nodes is equal to or less than a preset threshold value. For example, in the above-described embodiment, when the number of block generation nodes exceeds the threshold value, the control parameter can be set to 0. This is because, when the number of the block generation nodes is sufficiently large, even if the block generation order is not controlled, the probability of fairly generating the block is high.

Also, according to the embodiment of the present disclosure, the block generation order control unit 130 can also control the block generation order on the basis of the difference in computing performance between the block generation nodes. For example, when the computing performance of the block generation nodes is similar, the number of blocks included in the unit section or the control parameter can be set to the larger value, or the control of the block generation order may not be executed. This is because, if the computing performance is similar, there is a high probability that a block is fairly generated even without another control.

Referring again to FIG. 7, the block size control unit 150 variably controls the size of the block. Specifically, the block size control unit 150 can variably control the size of a new block generated after the current time. When the block size control unit 150 sets the block size to a large value, since the number of transaction data recorded in each block increases, the throughput of the system for processing data based on blockchain can be improved.

According to the embodiment of the present disclosure, the block size control unit 150 can variably set the block size based on the available bandwidth of the network. For example, when the available bandwidth is equal to or less than the threshold value, the block size control unit 150 can set the block size to a small value. This is because, when the available bandwidth is not sufficient, if the block size is increased, the performance of the entire system may be degraded due to transmission delay according to the block propagation.

Each constituent element of FIG. 7 explained above may mean software or hardware such as FPGA (Field Programmable Gate Array) or ASIC (Application-Specific Integrated Circuit). However, the above-described constituent elements are not limited to software or hardware, but may be configured to be in a storage medium capable of addressing, and may be configured to execute one or more processors. The functions provided in the above-mentioned constituent elements can be provided by the further segmented constituent elements, and a plurality of constituent elements can be combined and provided as one constituent element performing a specific function.

Next, a hardware configuration diagram of the blockchain management apparatus 100 which is a constituent element of the system for processing data based on blockchain will be described referring to FIG. 8.

Referring to FIG. 8, the blockchain management apparatus 100 includes one or more processors 101, a bus 105, a network interface 107, a memory 103 for loading a computer program executed by the processor 101, and a storage 109 for storing the blockchain-based data processing software 109*a*. However, only the constituent elements associated with the embodiment of the present disclosure are illustrated in FIG. 8. Therefore, one of ordinary skill in the art to which the present disclosure belongs may understand that other general-purpose constituent elements may be further included, in addition to the constituent elements illustrated in FIG. 8.

The processor 101 controls the overall operation of each configuration of the blockchain management apparatus 100. The processor 101 may be configured to include a CPU (Central Processing Unit), a MPU (Micro Processor Unit), a MCU (Micro Controller Unit), a GPU (Graphic Processing Unit), or any type of processor well known in the technical field of the present disclosure. In addition, the processor 101 may execute the operation of at least one application or program for executing the method according to the embodiment of the present disclosure. The blockchain management apparatus 100 may include one or more processors.

The memory 103 stores various types of data, commands, and/or information. The memory 103 may load one or more programs 109a from the storage 109 in order to execute the instruction transaction processing method according to the embodiments of the present disclosure. In FIG. 8, a RAM is illustrated as an example of the memory 103.

The bus 105 provides a communication function between the constituent elements of the blockchain management apparatus 100. The bus 105 may be provided as various forms of bus such as an address bus, a data bus and a control bus.

The network interface 107 supports wired/wireless Internet communication of the blockchain management apparatus 100. Also, the network interface 107 may support various communication methods other than the Internet communication. To this end, the network interface 107 may be configured to include a communication module that is well-known in the technical field of the present disclosure.

The storage 109 may non-temporarily store one or more programs 109a. In FIG. 8, the blockchain-based data processing software 109a is illustrated as the example of one or more programs 109a.

The storage 109 may be configured to include a nonvolatile memory such as a ROM (Read Only Memory), an EPROM (Erasable Programmable ROM), an EEPROM (Electrically Erasable Programmable ROM), and flash memory, a hard disk, a removable disk, or a computer-readable recording medium of any form well-known in the technique field to which the present disclosure pertains.

The blockchain management software 109a can control and/or manage the operation of the system for processing data based on blockchain according to an embodiment of the present disclosure.

Specifically, the blockchain-based data processing software 109a is loaded into the memory 103 and may execute a series of instructions for controlling the block generation cycle, a series of instructions for controlling the block generation order, a series of instructions for controlling the block size, and the like, by one or more processors 101.

The blockchain management apparatus 100 which is one constituent element of the system for processing data based on blockchain according to the embodiment of the present disclosure has been described above referring to FIGS. 7 to 9. Next, the user terminal 300 which is another constituent element of the system for processing data based on blockchain will be described with reference to FIG. 10.

Figure 10:
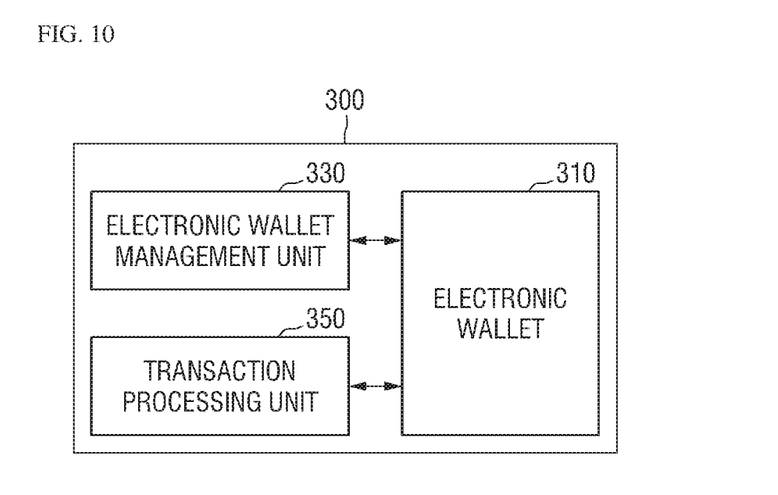
FIG. 10 is a block diagram illustrating a user terminal which is a constituent element of the system for processing data based on blockchain.

FIG. 10 is a block diagram illustrating the user terminal 300.

Referring to FIG. 10, the user terminal 300 may include an electronic wallet 310, an electronic wallet management unit 330, and a transaction processing unit 350. However, FIG. 10 illustrates only the constituent elements associated with the embodiment of the present disclosure. Therefore, one of ordinary skill in the art to which the present disclosure belongs can understand that other general-purpose constituent elements may be further included, in addition to the constituent elements illustrated in FIG. 10. In addition, each constituent element of the blockchain management apparatus 100 illustrated in FIG. 10 illustrates functionally distinguished functional elements, and it is noted that at least one constituent element may be provided in the manner of being integrated with each other in an actual physical environment.

Each constituent element will be described. The electronic wallet 310 manages the user's electronic currency. According to an embodiment of the present disclosure, the electronic wallet 310 may be configured in a hierarchical structure. Since the description thereof has been provided above with reference to FIG. 5, the description thereof will not be provided.

The electronic wallet management unit 330 generates or manages the electronic wallet 310 in response to the user's request. Specifically, the electronic wallet management unit 330 can generate the electronic wallet 310 of the hierarchical structure illustrated in FIG. 5 in response to the user's electronic wallet generation request.

The transaction processing unit 350 can process the transaction of the electronic currency kept in the electronic wallet 310 in response to the user's transaction processing request. Specifically, the transaction processing unit 350 can process a transaction of a user who remits a electronic currency via a blockchain network interlocked with the electronic wallet 310.

Each of the constituent elements of FIG. 10 described above can mean software or hardware such as FPGA (Field Programmable Gate Array) or ASIC (Application-Specific Integrated Circuit). However, the above-described constituent elements are not limited to software or hardware, but may be configured to be in a storage medium capable of addressing, and may be configured to execute one or more processors. The functions provided in the above-mentioned constituent elements can be provided by further segmented constituent elements, and a plurality of constituent elements can be combined and provided as one constituent element which performs a specific function.

The user terminal 300 which is a constituent element of the system for processing data based on blockchain according to the embodiment of the present disclosure has been described above referring to FIG. 10. Next, an instant transaction processing method that can be executed in a system for processing data based on blockchain according to some embodiments of the present disclosure will be described referring to FIG. 11.

As it will be described below, each step of the instant transaction processing method according to an embodiment of the present disclosure can be executed by a computing apparatus. For example, the computing apparatus may be at least one computing apparatus which constitutes a system for processing data based on blockchain. However, for the sake of convenience of explanation, the description of the operation subject of each step included in the instant transaction processing method may be omitted. Further, each step of the instant transaction processing method may be provided as an operation executed by the processor mounted on the at least one computing apparatus.

Figure 11:
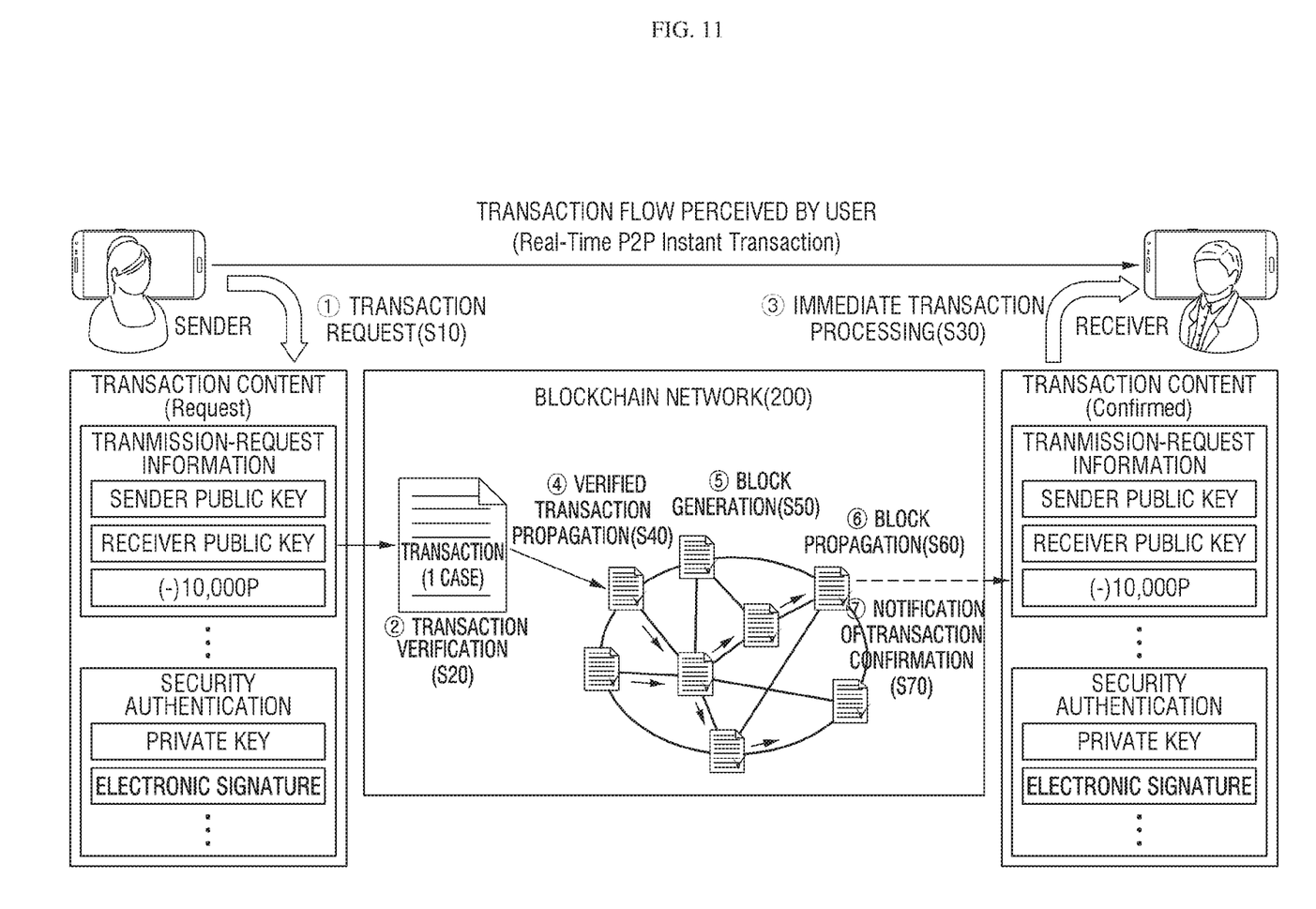
FIG. 11 is a diagram for explaining an instant transaction processing method based on blockchain according to another embodiment of the present disclosure.

FIG. 11 is a diagram for explaining a blockchain based instant transaction processing method according to an embodiment of the present disclosure. Specifically, FIG. 11 illustrates processing procedures of a transaction in which a first user who is a sender transfers a electronic currency (e.g., point) to a second user who is a receiver.

Referring to FIG. 11, the first blockchain node among the plurality of blockchain nodes receives the processing request of the processing target transaction in which the first user is the sender and the second user is the receiver (S10). Here, the first blockchain node may be a user terminal, but in the case where the user terminal does not constitute a blockchain network, the first blockchain node may be a blockchain node which receives the transaction processing request from the user terminal.

Next, in response to the processing request of the processing target transaction, the first blockchain node verifies the validity of the processing target transaction (S20). For example, the validity of the processing target transaction can be verified via sender's permission verification, the balance checking, and the like. If verification succeeds at the step (S20), the processing target transaction can be recorded in a temporary pool. The temporary pool can be understood as a place where transaction data is temporarily kept before transaction data is recorded in the block. This is a matter obvious to ordinary technicians in the technical field and the further explanation will not be provided.

Next, when the processing target transaction is valid, the first blockchain node immediately reports the completion of processing of the verified processing target transaction to the terminal of the second user who is the receiver (S30). Then, the transaction is immediately processed in the terminal of the second user, and the electronic currency remittance process can be completed.

Next, the first blockchain node transfers (S40) the verified processing target transaction to the block generation node which generates the new block, among the plurality of blockchain nodes, the block generation node records (S50) the verified processing target transaction in the new block, and propagates (S60) the new block to other blockchain node. Finally, when the data of the processing target transaction is recorded in the block and added on the blockchain data, the specific blockchain node reports the confirmation of the processing target transaction to the terminal of the second user (S70).

According to the instant transaction processing method described above, before the processing target transaction is recorded in a specific block on the blockchain data, the transaction can be immediately processed at the terminal of the transaction party. As a result, the response speed of the transaction processing can be greatly improved, and the satisfactory level of the user of the blockchain-based service can be improved. In the present embodiment, the reliability of instant transaction processing can be understood to be secured by a blockchain network 200 provided as a permission-based blockchain network.

On the other hand, according to the instant transaction processing method described above, since transaction processing is completed before transaction data is recorded in the new block, the second user who is a receiver of the electronic currency remits the electronic currency to the third user, an error may occur in the transaction verification step (S20). Specifically, before the electronic currency received by the second user is recorded on the blockchain data, there may be a problem in which the transaction requested by the second user is determined to be an invalid transaction due to the insufficient balance.

In order to solve such a problem, according to the embodiment of the present disclosure, in addition to the electronic currency balance recorded in the blockchain data, in consideration of the electronic currency balance recorded in the temporary pool in the transaction verification step (S20), validity validation of the transaction can be performed.

In other words, in the above situation, validity of the transaction requested by the second user can be verified, on the basis of the total sum of the electronic currency balance of the second user recorded on the blockchain data and the electronic currency balance of the second user recorded in the temporary pool.

The instant transaction processing method according to the embodiment of the present disclosure has been described above with reference to FIG. 11.

The concepts of the disclosure described above with reference to FIGS. 3 to 111 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A blockchain management apparatus comprising:
   at least one hardware processor configured to:
   implement a block generation order control unit which prevents a block generation node of a plurality of blockchain nodes from generating a new block of a blockchain in response to a determining, by the blockchain management apparatus, that if another block is generated by the block generation node within a unit section,
   wherein the unit section corresponds to a preset number of blocks measured from a current block corresponding to a current block height of the blockchain, and
   the blockchain management apparatus manages a permission-based blockchain network including the plurality of blockchain nodes.

2. The blockchain management apparatus of claim 1, wherein
   when a first blockchain node of the plurality of blockchain nodes participates in the permission-based blockchain network, a first verification of a first permission of the first blockchain node is performed, and
   when the first blockchain node receives a first new block, a second verification of a second permission of a block generation node which generates the first new block is performed.

3. The blockchain management apparatus of claim 2, wherein the second permission is higher than the first permission.

4. The blockchain management apparatus of claim 1, wherein a verification of a second blockchain node included in the permission-based blockchain network is performed using permission information of the second blockchain node recorded in the blockchain.

5. The blockchain management apparatus of claim 1, wherein the preset number is updated by the blockchain management apparatus to a larger value when one or more block generation nodes are added to the plurality of blockchain nodes.

6. The blockchain management apparatus of claim 1, wherein the block generation order control unit is configured to control a block generation order, in response to a determining that a number of block generation nodes is equal to or less than a preset threshold value.

7. The blockchain management apparatus of claim 1, wherein the block generation order control unit is configured to set a control parameter having a value in a range of 0 to 1 to control generation of the new block by the block generation node, and the preset number of blocks is determined by the blockchain management apparatus based on the value of the control parameter and a number of block generation nodes.

8. The blockchain management apparatus of claim 1, wherein the blockchain management apparatus further comprises a block generation period control unit configured to control a block generation cycle, by adjusting a difficulty of block generation.

9. The blockchain management apparatus of claim 8, wherein the block generation period control unit is configured to control a block generation cycle based on a frequency of branch occurrences on the blockchain during a preset period.

10. The blockchain management apparatus of claim 9, wherein the blockchain management apparatus further comprises a monitoring unit which receives information on the branch occurrence from a monitoring node, and a frequency of the branch occurrence is calculated by the blockchain management apparatus based on the information, wherein the permission-based blockchain network includes the monitoring node.

11. The blockchain management apparatus of claim 1, wherein the blockchain management apparatus further comprises a block size control unit configured to control a size of a generated block.

12. The blockchain management apparatus of claim 1, wherein a distributed database managed by a plurality of external storage nodes stores the blockchain, and wherein the plurality of blockchain nodes accesses the plurality of external storage nodes with respect to the blockchain.

\* \* \* \* \*